(12) United States Patent
Kasseris et al.

(10) Patent No.: US 11,236,279 B2
(45) Date of Patent: Feb. 1, 2022

(54) ENGINE CONCEPTS FOR HANDLING PRODUCER GAS FROM BIOMASS

(71) Applicant: Massachusetts Institute of Technology, Cambridge, MA (US)

(72) Inventors: Emmanouil Kasseris, Somerville, MA (US); Leslie Bromberg, Sharon, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 138 days.

(21) Appl. No.: 16/471,077

(22) PCT Filed: Dec. 20, 2017

(86) PCT No.: PCT/US2017/067510
§ 371 (c)(1),
(2) Date: Jun. 19, 2019

(87) PCT Pub. No.: WO2018/119032
PCT Pub. Date: Jun. 28, 2018

(65) Prior Publication Data
US 2019/0322953 A1 Oct. 24, 2019

Related U.S. Application Data

(60) Provisional application No. 62/437,101, filed on Dec. 21, 2016.

(51) Int. Cl.
*C10K 3/00* (2006.01)
*C10L 1/02* (2006.01)
*F02B 43/08* (2006.01)
*F23G 5/027* (2006.01)

(52) U.S. Cl.
CPC ............. *C10K 3/005* (2013.01); *C10L 1/026* (2013.01); *F02B 43/08* (2013.01); *F23G 5/027* (2013.01);
(Continued)

(58) Field of Classification Search
CPC ......... C10K 3/005; C10L 1/026; F02B 43/08; F23G 5/027
See application file for complete search history.

(56) References Cited

U.S. PATENT DOCUMENTS 4,907,565 A * 3/1990 Bailey .................... F02B 45/00
123/23
2003/0164162 A1* 9/2003 Vinyard ................ F02D 19/081
123/525

(Continued)

FOREIGN PATENT DOCUMENTS

DE 102004055407 A1 5/2006
DE 202008018189 U1 2/2012
EP 0801218 A1 10/1997

OTHER PUBLICATIONS

International Search Report and Written Opinion dated Jun. 6, 2018 in corresponding PCT application No. PCT/US2017/067510.
(Continued)

Primary Examiner — Matthew J Merkling
(74) Attorney, Agent, or Firm — Nields, Lemack & Frame, LLC

(57) ABSTRACT

Internal combustion engines tolerant to tar-containing producer gas are disclosed. Two concepts are described. The engines are tolerant to producer gas from a biomass gasifier with minimal pretreatment. When biomass is gasified to be burned for power generation or to be used to synthesize chemicals such as biofuels, a large fraction of the installation cost is spent on equipment to clean up the heavy organic components (also referred to as 'tars') from the gas stream, hereafter referred to as 'producer gas'. The invention described herein may be used to enable power generation from gasified biomass with minimal treatment. It may also be used to treat biomass at a very low cost for other uses such as synthesizing chemicals. The producer gas is not (Continued)

necessarily limited to biomass derived. Producer gas derived from coal or other sources has similar issues and the invention described herein would be equally applicable.

35 Claims, 7 Drawing Sheets

(52) U.S. Cl.
CPC ............ *C10J 2300/1606* (2013.01); *C10J 2300/1621* (2013.01)

(56) References Cited

U.S. PATENT DOCUMENTS

| | | | | |
|---|---|---|---|---|
| 2010/0040510 | A1* | 2/2010 | Randhava | C10K 3/023 422/140 |
| 2012/0304540 | A1* | 12/2012 | Hulteberg | C10J 3/721 48/128 |
| 2013/0000569 | A1* | 1/2013 | Schneider | F02B 43/08 123/3 |
| 2013/0047573 | A1* | 2/2013 | Mishra | C10K 1/026 60/39.12 |

OTHER PUBLICATIONS

Hagos et al., "Trends of Syngas as a Fuel in Internal Combustion Engines", Advances in Mechanical Engineering, vol. 6, pp. 1-10, Jan. 2014.

Singh et al., "Tar Removal from Producer Gas: A Review", Research Journal of Engineering Sciences, vol. 3, No. 10, pp. 16-22, Oct. 2014.

Japanese communication, with English translation, dated Jul. 13, 2021 in corresponding Japanese patent application No. 2019-533574.

* cited by examiner

ENGINE CONCEPTS FOR HANDLING PRODUCER GAS FROM BIOMASS

This application claims priority from U.S. Provisional Patent Application Ser. No. 62/437,101, filed Dec. 21, 2016, the disclosure of which is incorporated herein by reference in its entirety.

FIELD

The present invention is in the technical field of power generation; and more specifically, in the technical field of power generation from biomass gasification.

BACKGROUND

There is a clear and unmet need for transformative technologies to improve biomass to power systems by reducing their cost and complexity to make them competitive with fossil fuels. The development of a biomass to power system that is competitive with fossil fuels would reduce our dependence of oil and improve energy security. Furthermore, it would also provide an engine for financial growth in rural areas both domestically and abroad.

According to the Union of Concerned Scientists, biomass resources totaling just under 680 million dry tons could be made available, in a sustainable manner, each year within the United States by 2030. This is enough biomass to produce 732 billion kilowatt-hours of electricity (19 percent of total U.S. power consumption in 2010). These biomass resources are distributed widely across the United States, ensuring that communities across America can benefit both financially and environmentally from increased biomass production. If allowed to biodegrade on its own, this biomass will generate substantial amounts of greenhouse gas (GHG) methane emissions. Approximately 6.5 liters of $CH_4$ are generated per kilogram of decaying biomass.

Globally, biomass represents a huge hope for rural electrification in a sustainable, low cost manner that can trigger economic development based on largely local resources. According to the World Bank, rural electrification can have a profound impact on reducing poverty and improving welfare in the developing world. The developing world already relies on biomass for its energy needs, in particular, for cooking. Furthermore, developing decentralized power generation in the developing world may in many cases make more sense compared to having to invest in a large centralized grid.

Because of the cost of transporting the biomass, biomass needs to be consumed locally, using small gasifiers. The main limitation of small scale gasification systems today is the cost of gas cleanup. A typical small scale gasification system can be seen in FIG. 1, which is adapted from Jan-Willem Konemann, Dahlman, Robin Zwart, ECN "OLGA Tar removal.4 MWt commercial demonstration biomass gasification in France", Gasification Technology Conference, San Francisco 2007. The producer gas from the biomass gasifier is first cooled down using a heat exchanger, then passed through a cyclone to filter solids and then through a series of scrubbers, reactors and/or absorbers to remove or chemically break down the heavy organic compounds that the producer gas contains before the gas can be burned for power in an internal combustion engine to power a generator or a mechanical load such as an irrigation pump. The cost of the clean-up system often exceeds that of the gasifier and the engine/generator combined. Removing tars is the single most important challenge facing biomass to power systems today.

The development of an affordable small scale biomass-to-power system will be instrumental in enabling biomass to power projects by reducing their cost.

SUMMARY

Internal combustion engines tolerant to tar-containing producer gas are disclosed. Two concepts are described. The engines are tolerant to producer gas from a biomass gasifier with minimal pretreatment.

The present invention is in the technical field of power generation. More specifically, the present invention is in the technical field of power generation from biomass gasification. When biomass is gasified to be burned for power generation or to be used to synthesize chemicals such as biofuels, a large fraction of the installation cost is spent on equipment to clean up the heavy organic components (also referred to as 'tars') from the gas stream, hereafter referred to as 'producer gas'. If not removed from the gas stream, tars will condense and foul any equipment surfaces as soon as the gas stream is cooled below their dew point. This drawback significantly limits the feasibility of biomass to power projects. The invention described herein may be used to enable power generation from gasified biomass with minimal treatment. It may also be used to treat biomass at a very low cost for other uses such as synthesizing chemicals. The producer gas is not necessarily limited to biomass derived. Producer gas derived from coal or other sources has similar issues and the invention described herein would be equally applicable.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Broadly, the present invention is a system, a method and an apparatus for generating power from producer gas with minimal cleanup or a method to clean up producer gas from heavy organic contaminants ('tars') for any use. Several different embodiments are disclosed.

Each of the systems will be described in more detail. The basic premise of the concept is never allowing the tar-laden producer gas temperature to drop below the dew point of organic contaminants. That dew point is around 350 C. Therefore, if the producer gas is never cooled below ~400 C and is combusted, there would be no need for expensive and complicated tar clean up equipment as the tar would simply get burned.

The approaches described herein have the potential to reduce the capital expense (CAPEX) of a biomass to power system by more than 50% by eliminating the tar clean up and cooling hardware. These approaches would also significantly reduce the operating expense (OPEX) of running a biomass to power system by reducing the complexity and maintenance required for the cooling and clean up system, but most importantly by eliminating the cost associated with disposing of a toxic material, such as tars.

Figure 1:
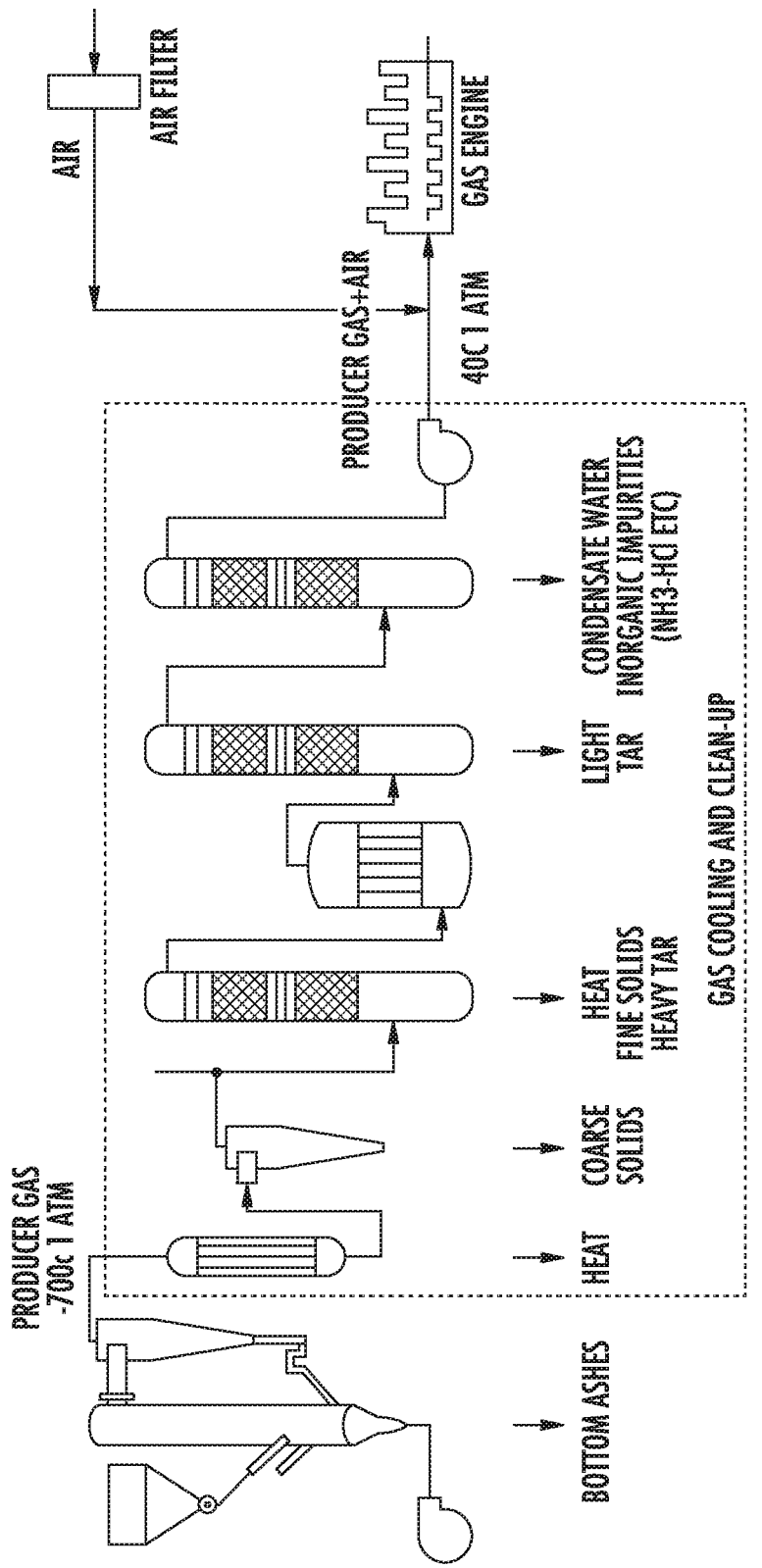
FIG. 1 is a typical small scale gasification system of the prior art.
Figure 2:
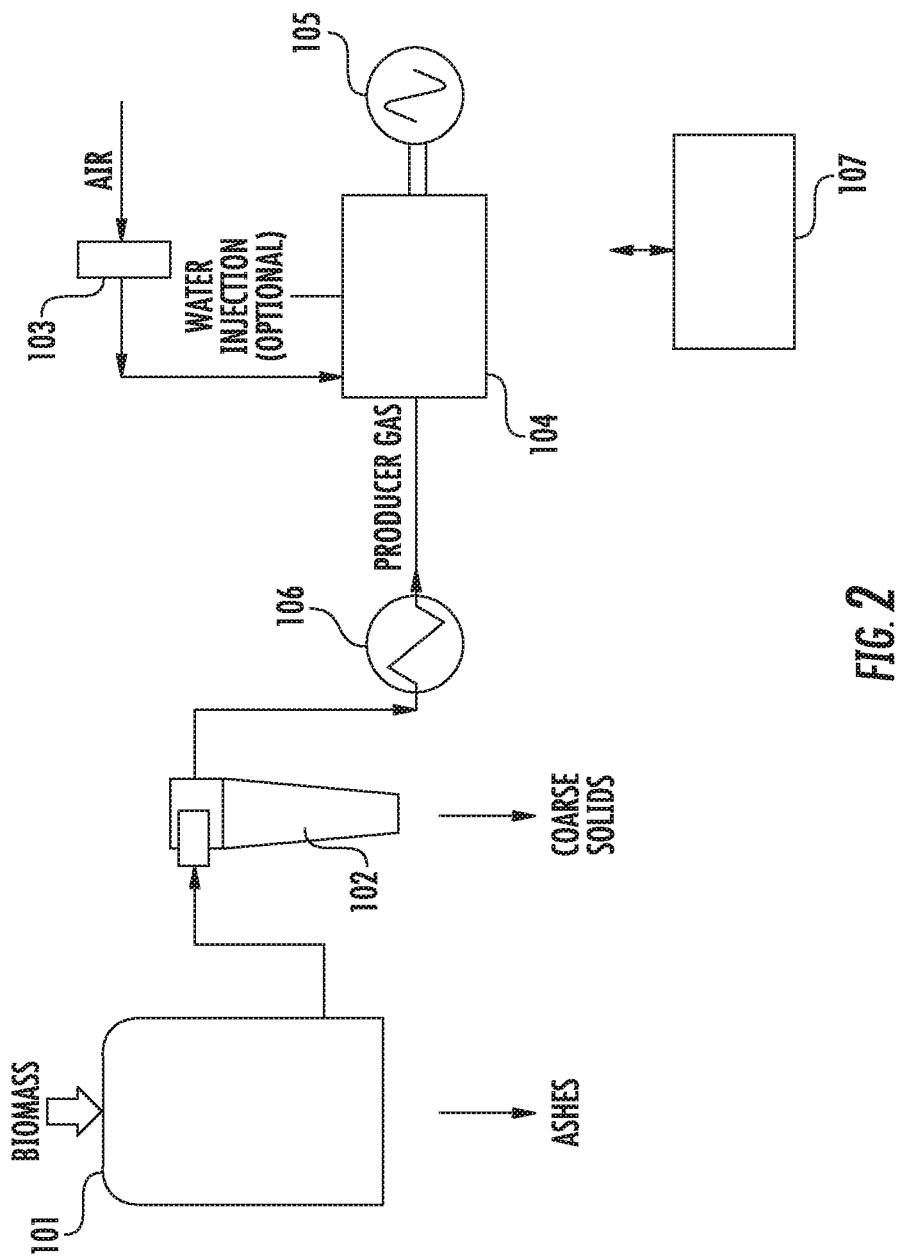
FIG. 2 is a small scale gasification system according to one embodiment.

Referring to the first embodiment of this invention in more detail, a process flow diagram of the method can be seen in FIG. 2. Biomass, or other organic material is fed to a gasifier 101 which generates producer gas, a mixture of $CH_4$, CO, $H_2$, $H_2O$, $N_2$ and heavier organic components, referred to as 'tars', that exits the gasifier at temperatures that can be 700 degrees centigrade. The producer gas is passed through a device 102 to remove solid contaminates. The device 102 may be a high temperature filter or a cyclone. This is the only gas processing component that is needed. The producer gas may potentially be cooled down in heat exchanger 106 to recover useful heat for biomass drying, air preheating or another use and prevent any danger of early auto-ignition as soon as it is mixed with air. The gas is subsequently mixed in with air that has passed through an air filter 103. The mixing may take place inside the cylinder of an internal combustion engine 104. The mixing cools the air and fuel mixture to a temperature that is still above the tar dew point in the mixture (around 400 degrees centigrade). For example, if two intake valves are used per cylinder, one intake valve may supply gas while the second intake valve supplies air. The mixture is subsequently burned inside the internal combustion gas engine 104 to generate mechanical power that can be used to move an electric generator 105. For example, the rotation of the drive shaft of the internal combustion engine 104 may allow the electric generator 105 to create power. The gas is always kept above the tar dew point. This approach prevents condensation of heavier organic compounds that cause fouling. In a conventional gasification to power scheme, such as that shown in FIG. 1, the gas is cooled down and cleaned up by using expensive process hardware. Note that no additional equipment is required in this concept other than the gasifier, a cyclone and the engine.

Due to the high temperature of the producer gas-air mixture, special care needs to be taken to avoid catastrophic auto-ignition of the mixture before spark (pre-ignition) or after spark (knock). To avoid auto-ignition, the unburnt mixture temperature needs to be controlled. To achieve this, water, or other liquid injection directly into the cylinder will be used. This is depicted in FIG. 2. The start of injection of the water or other liquid takes place slightly before or after the intake valve closes, so that the evaporation of the water takes place during the compression stroke. This ensures that the cooling due to evaporation partially counteracts the gaseous mixture heating due to compression. The temperature of the cylinder charge is controlled by the amount and rate of injection of the liquid, avoiding conditions where the temperature drops below the tar dew point.

When mixing the producer gas with the air in cylinder, care needs to be taken so that there is no auto-ignition during the intake stroke. A controller 107 may be used to control the operation of the internal combustion engine 104, and more specifically, the timing of the intake valves, the timing of the exhaust valves, the timing of the direct injectors (opening time and duration), the timing of the spark and the amount of liquid that is directly injected. The controller 107 may include a processing unit and an associated memory device. The memory device may include instructions, which when executed by the processing unit, enable the controller 107 to control the operation of the engine as described herein.

When the cold air mixes with the hot producer gas in the cylinder of the internal combustion engine 104, the cold air should cool the producer gas down significantly so that the auto-ignition delay is long enough to prevent auto-ignition before compression. However, if mixing is imperfect and there are any spots that are sufficiently hot and have higher concentrations of oxygen, it could cause auto ignition of these spots. If one of the intake valves is used for air and the other intake valve is used for producer gas, appropriate valve timing could be provided by the controller 107 to ensure good mixing. Additionally, the controller 107 may also control the timing of the injection of liquid, such as water, directly into the cylinder, as described above.

The above configuration was verified using computer models. As exemplary calculations, gas from a well-developed gasifier was used. The syngas composition (excluding tars) is shown in Table 1. A 17% water content, similar to that of CO, was assumed.

Figure 6A:
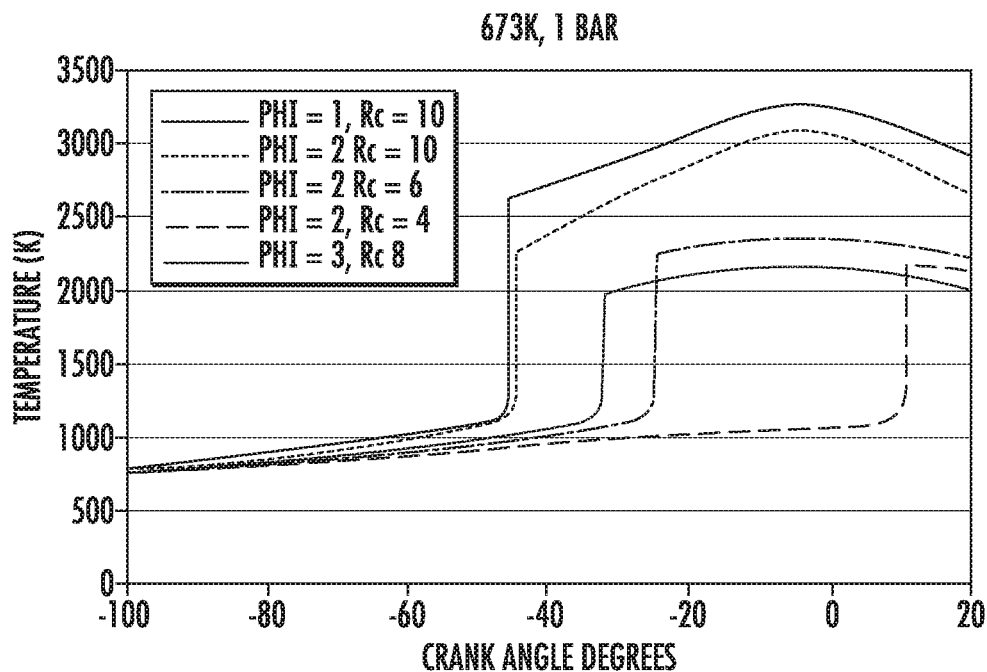
FIGS. 6a-6b show simulation results for the embodiment of FIG. 2.
Figure 6B:
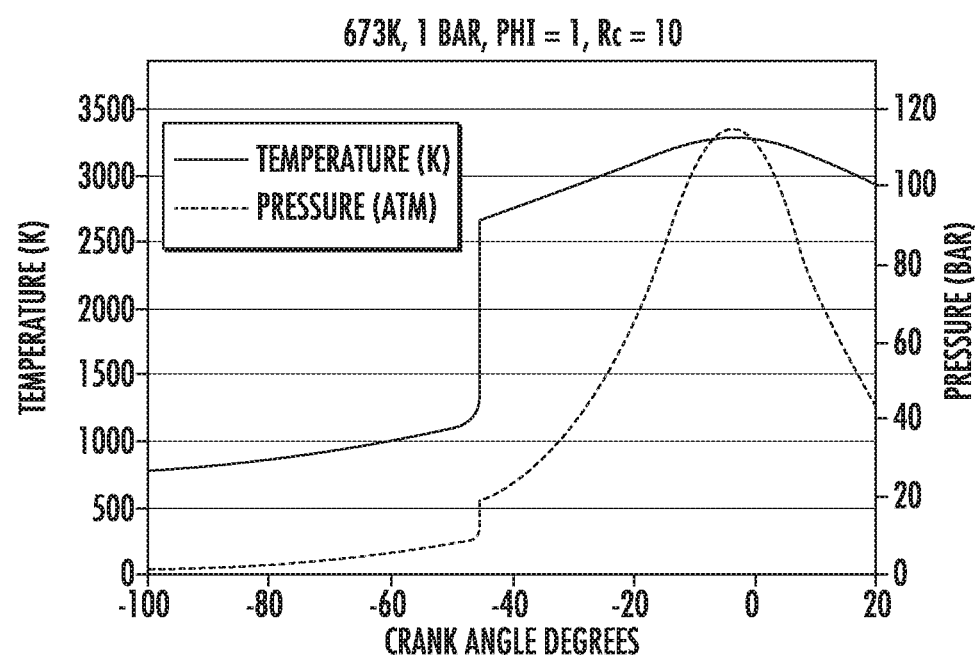

FIG. 6a shows the results of the calculations, assuming that the air/fuel mixture is at 400 C (673 K) at Bottom Dead Center (BDC), for different compression ratios and equivalence ratios. FIG. 6a shows the temperature in the cylinder as a function of crank angle degrees for different compression ratios and equivalence ratios. Only stoichiometric and rich operation are illustrated, but the results are similar for lean operation. The large sudden temperature rise is due to auto-ignition of the homogeneous air/fuel mixture. Although the rate of pressure rise is relatively moderate in this case, the very early combustion of the air/fuel mixture is deleterious to efficiency and results in high peak pressures. In FIG. 6b, the temperature and pressure as a function of crank angle degrees are shown for one of the cases in FIG. 6a, for stoichiometric operation with a compression ratio of 10. The peak pressure is about 110, as a result of early combustion of the air fuel mixture, followed by compression.

TABLE 1

Producer Gas Composition Used to Generate the Simulation Results shown in FIG. 6a

| Fuel Composition (Producer Gas) | |
|---|---|
| $CH_4$ | 1% |
| CO | 17% |
| $CO_2$ | 13% |
| $H_2$ | 25% |
| $H_2O$ | 17% |
| $N_2$ | 28% |
| Oxidizer Composition (Air) | |
| $N_2$ | 79% |
| $O_2$ | 21% |

To prevent auto ignition in this mode of operation, in-cylinder water injection is used. The concept can be seen in FIG. 2. Premixed producer gas and stoichiometric air is inducted into the engine at a temperature of at least 400 C. Water is injected directly into the cylinder during the compression stroke to evaporate and cool the charge before combustion. It is expected that the water cools the air/fuel mixture homogeneously, which requires large charge motion in the cylinder during the compression stroke. Note that no additional equipment is required in this concept other than the gasifier, a cyclone and the engine.

Figure 4:
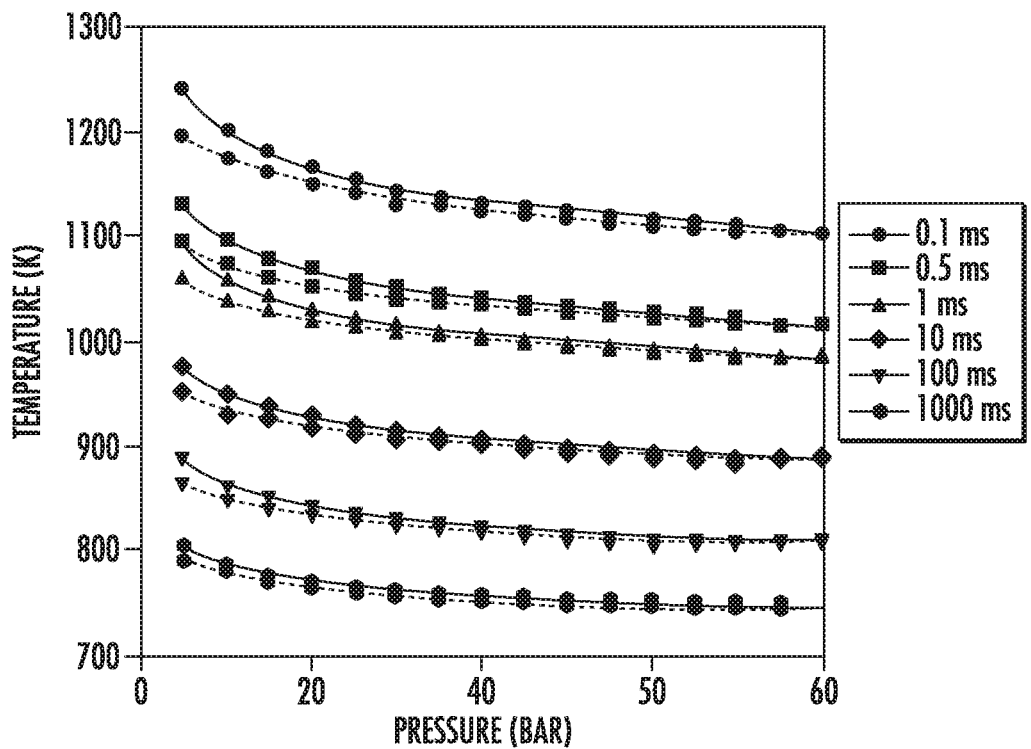
FIG. 4 is a graph showing the relationship between temperature, pressure and auto-ignition time.
Figure 5:
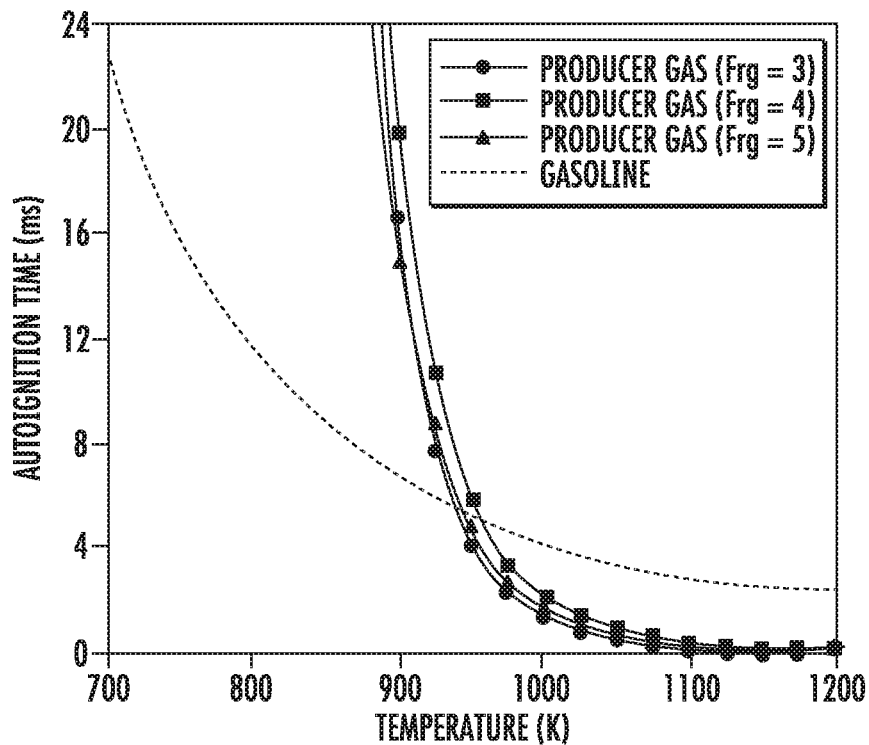
FIG. 5 is a graph showing the relationship between autoignition time, temperature and producer gas composition.

The auto ignition delay under stoichiometric conditions for a typical producer gas from gasification of lignocellulosic biomass can be seen in FIG. 4 and FIG. 5. FIG. 4 shows the relationship between temperature, pressure and auto-ignition time. FIG. 4 shows an autoignition time chart of a stoichiometric mixture of producer gas and air. The solid lines represent Frg=3, while the dotted lines represented Frg=5, where Frg represents the biomass to air ratio. FIG. 5 shows the relationship between auto-ignition time, temperature and the composition of the producer gas. FIG. 5 shows the auto ignition time (in milliseconds) or stoichiometric mixtures of different fuels and air at 20 bar. ("Thermochemical Behavior of Producer Gas from Gasification of Lignocellulosic Biomass in SI Engines", M. Lapuerta et al, Society of Automotive Engineers SAE Technical Paper 2001-01-3586)

Figure 7:
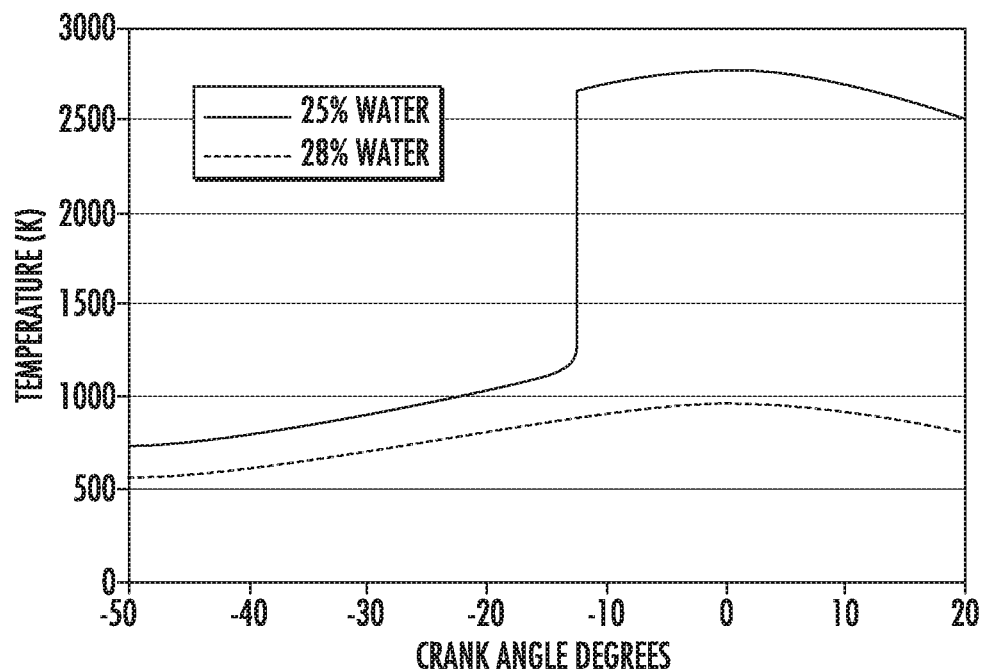
FIG. 7 shows the effect of direct injection of water in the embodiment of FIG. 2.

Chemical kinetics simulation results of this type of operation using CHEMKIN software can be seen in FIG. 7 for the producer gas composition of Table 1. FIG. 7 shows the in-cylinder temperature as a function of crank angle degrees for a producer gas having two different water contents. FIG. 7 shows that with 10% water addition, there is a large increase in temperature, which indicates that there is still knock (auto-ignition). The producer gas already contained 17% water in vapor form, so 10% liquid water injection results in about 25% final water vapor concentration after evaporation. With 15% liquid water injection (28% final vapor), there is no knock as can be seen in FIG. 7. The calculated laminar flame speed under the same conditions was 45.4 cm/s; which is comparable with stoichiometric gasoline air mixtures, indicating that flame stability will not be a problem because of the dilution with water. The composition of the producer gas (Table 1) already contains a high amount of water which reduces flame speed and stability. Well-designed gasifiers would produce much lower water content.

It is clear that auto-ignition happens very fast when the gases are above 600-700 C (900-1000 K). This has two implications:

It is preferable to mix the hot producer gas with the air inside the cylinder and not in the intake manifold, as is common practice in producer gas engines, because there is a danger of auto-ignition in the manifold. For a starting producer gas temperature of 700 C, when mixed with ambient air, the temperature of the mixture would drop to 350-400 C. However, there could be pockets of mixture that are hot enough and/or contain sufficient oxygen for auto-ignition. On the other hand, if there is too much air locally and the temperature drops too much, it is possible to have formation of tar droplets. Thus, fast, uniform mixing is critical.

There is a very high chance that the air and producer gas mixture will auto-ignite when compressed during the compression and combustion part of the cycle in a conventional spark ignited internal combustion engine leading to catastrophic engine knock. In fact, chemical kinetics simulations using CHEMKIN show that without active cooling, a stoichiometric mixture would auto-ignite leading to catastrophic engine knock even with a compression ratio of 4 as will be seen. Some means to alleviate the danger of auto-ignition is necessary.

A modified commercial direct (fuel) injected engine can be used to inject the liquid, which can be water. Water injection is a known practice with applications in racing to avoid engine knock is and stationary engines for reducing NOx emissions. In the engine, in order to optimize the combustion, the equivalence ratio should be 1 or less (stoichiometric or lean). If it is rich, there is going to be substantial amounts of CO in the exhaust, but may have improved combustion stability. The amount of water to be introduced in the engine is a tradeoff between knock avoidance and overcooling the cylinder charge below the dew point of the tars. It may also be possible to inject water after the combustion as means of improving efficiency.

Figure 3:
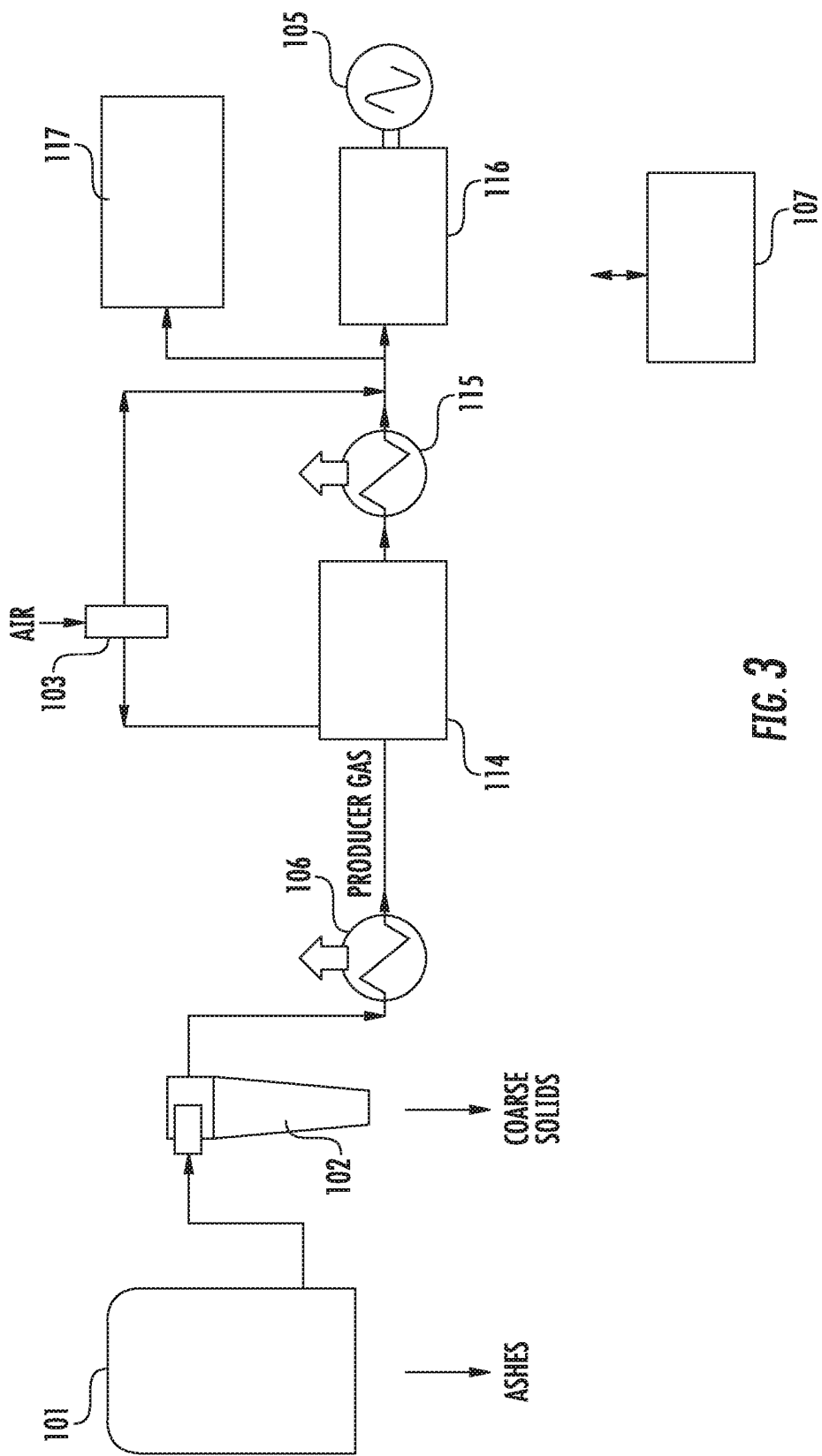
FIG. 3 is a small scale gasification system according to another embodiment.

A second embodiment of the present invention can be seen in FIG. 3. Similar components have been given like reference designators. In this configuration, the producer gas from gasifier 101, is again passed through a device 102, such as a high temperature filter or cyclone, to remove solid contaminants. The producer gas could potentially be cooled down in heat exchanger 106 to recover useful heat for biomass drying, air preheating or another use and prevent any danger of early auto-ignition as soon as it is mixed with air. In other embodiments, the producer gas may not be cooled. The producer gas is subsequently mixed with a small amount of air after the air has passed through an air filter 103. This small amount may be less than 50% of the stoichiometric amount in certain embodiments, may be less than 20% of the stoichiometric amount in certain embodiments, and may be between 5-10% of the stoichiometric amount in certain embodiments. The remainder of the air from the air filter 103 may be fed to the power engine 116. In all embodiments, the mixture fed to the clean-up engine 114 is a rich mixture, where the amount of air is less than the stoichiometric amount, up to and including the possibility of running without any free oxygen.

The mixing of the producer gas and the air could take place outside or inside the cylinder of a gas internal combustion engine. In certain embodiments, the producer gas and the air may be introduced through different intake valves in the cylinder. In another embodiment, the producer gas and the air may be injected separately just upstream of their respective intake valves so that for enhanced safety there is limited mixing outside of the cylinder. The rich mixture is subsequently compressed inside the cylinders of the first internal combustion engine, which is referred to as the clean-up engine 114. Even without assistance from an ignition source such as a spark plug, the rich mixture will auto-ignite and partially burn at some point during the compression stroke. Because there is only a limited amount of air available, the auto-ignition in this case is controlled. Only a small amount of the fuel will burn. The pressure and temperature rise, as well as the rise rate, are therefore not destructive for the engine hardware. The in cylinder temperatures may not be high enough to cause any damage to the engine but they are enough to destroy the tars. Thus, in certain embodiments, the cylinders of the clean-up engine 114 do not employ an ignition source. Rather, they rely on the rich mixture and high pressure to cause ignition. In other embodiments, a spark plug can be used.

After the tars have been destroyed by the high temperatures caused by compression and partial combustion in the clean-up engine 114, the fuel is exhausted by the clean-up engine 114. This outputted gas may be referred to as cleaned producer gas, since it lacks the heavy organic components or tars that were present in the intake to the clean-up engine 114. It is noted that smaller organic components may still be present in the cleaned producer gas, but this exhaust is cleaner than the intake. The goal is to eliminate heavy compounds. In one preferred embodiment, temperatures and residence times are adjusted in order to destroy benzene. It has been determined that benzene is one of the most stable compounds that result from the pyrolysis/combustion of heavier elements. Another stable element is soot. If soot is generated, it can be eliminated by the use of conventional filters (Diesel particular filters), for example, if the clean syngas is going to be used in chemical reactors. In the case when the syngas is going to be used as fuel in a second engine, the soot can be either eliminated with a filter, or else introduced into the second engine, where it would be combusted.

The cleaned producer gas may be cooled down in a second heat exchanger 115 to recuperate useful heat. The two heat exchangers 106, 115 in FIG. 3 can potentially be combined into one heat exchanger that has two hot streams and one cold stream for reduced cost.

In certain embodiments, the cleaned producer gas can now be cooled down below the tar dew point without fouling issues since the tars have been destroyed. The gas can subsequently be burned for mechanical power in a second gas internal combustion engine, also referred to as the power engine 116, for example to drive an electric generator 105. For example, the rotation of the drive shaft of the power engine 116 may allow the electric generator 105 to create power. Alternatively, instead of an engine, the cleaned producer gas could be used for synthesizing chemicals using a synthesis plant 117. The chemical synthesis plant can for example comprise a Fischer-Tropsch reactor to make hydrocarbon fuels, or a producer gas to methanol/DME reactor, or for making ethanol, or for making ammonia. Alternatively, the syngas can be processed to make hydrogen.

It may make sense if a chemical synthesis plant is used, to have the cleaned producer gas at higher pressures. In this case, the clean-up engine is also operating as a compressor. The valve timing may or may not be adjusted, but the exhaust manifold is constricted so that it is at high pressure. The opening of the exhaust valve could be at the time when the cylinder pressure and the exhaust pressure are the same. In this case, the maximum work is extracted from the engine (there is power that can be extracted because of the limited combustion in tar-destruction with limited oxidizer). If the valve opens earlier than this, the cylinder charge flows at high speed through the exhaust valve. If it opens later than this, there is reflux, where gas in the exhaust manifold initially flows into the cylinder. Under both conditions (opening the exhaust valve when the cylinder pressure is either higher or lower than in the exhaust manifold), the engine does additional work and the efficiency suffers. Larger expansion in the cylinder, even if it results in pressure lower in the cylinder than in the exhaust manifold, results in lowering of the temperature of the charge in the cylinder, at the expense of a loss in efficiency. However, minimization of the need for the heat exchanger may be more advantageous than the loss in efficiency.

In the case of a pressurized exhaust, the level of residuals (gas left in the cylinder after the exhaust valve closes) is higher than when the exhaust is at atmospheric pressure. In this case, the residuals in the cylinder are cleaned producer gas from the previous cycle, at a similar pressure as that in the exhaust manifold.

This disclosure is not intended to limit the use of the clean-up engine 114 for the synthesis of liquid fuels. Rather, the clean-up engine 114 is used for the production of cleaned producer gas. This cleaned producer gas may be used for synthesis of other chemicals. Hydrogen or ammonia production, for example, could be other applications.

The heat exchangers 106, 115 could be combined into one exchanger to reduce costs. Similarly, clean-up engine 114 and power engine 116 could also be combined into one engine to reduce costs. This may be done by having, for example, some cylinders operating rich, with sub stoichiometric air (in other words, act as the clean-up engine) and some cylinders burning the cleaned producer gas after mixing in the remaining air (in other words, act as the power engine). In one embodiment, an equal number of cylinders in the engine act as the clean-up engine and as the power engine.

Figure 8:
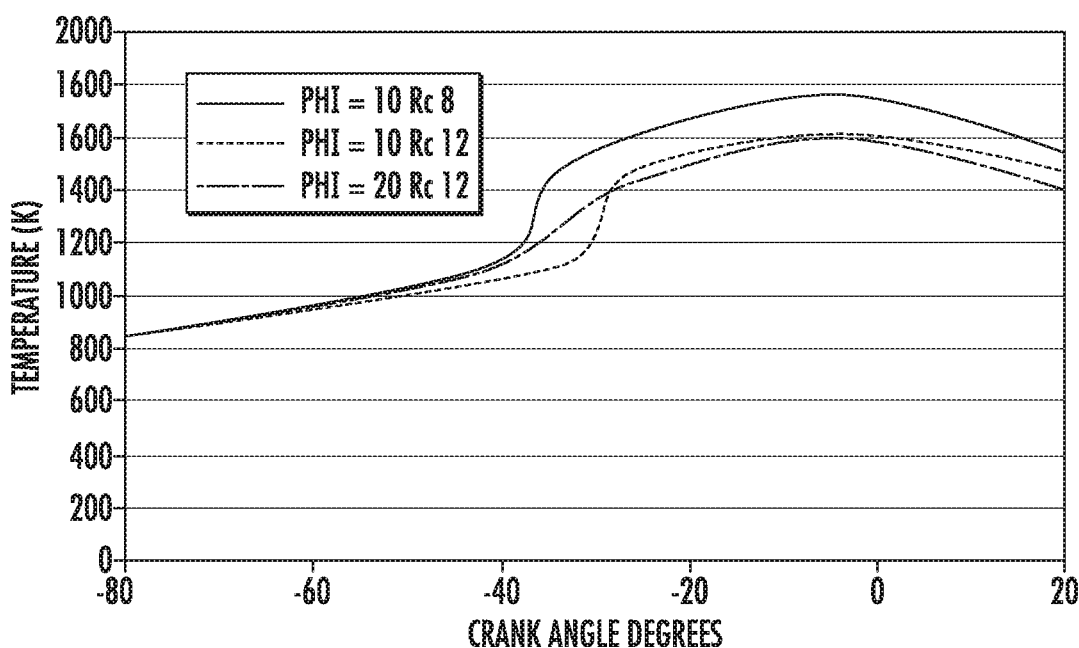
FIG. 8 shows simulation results illustrating the in cylinder temperatures for the embodiment of FIG. 3.
Figure 9:
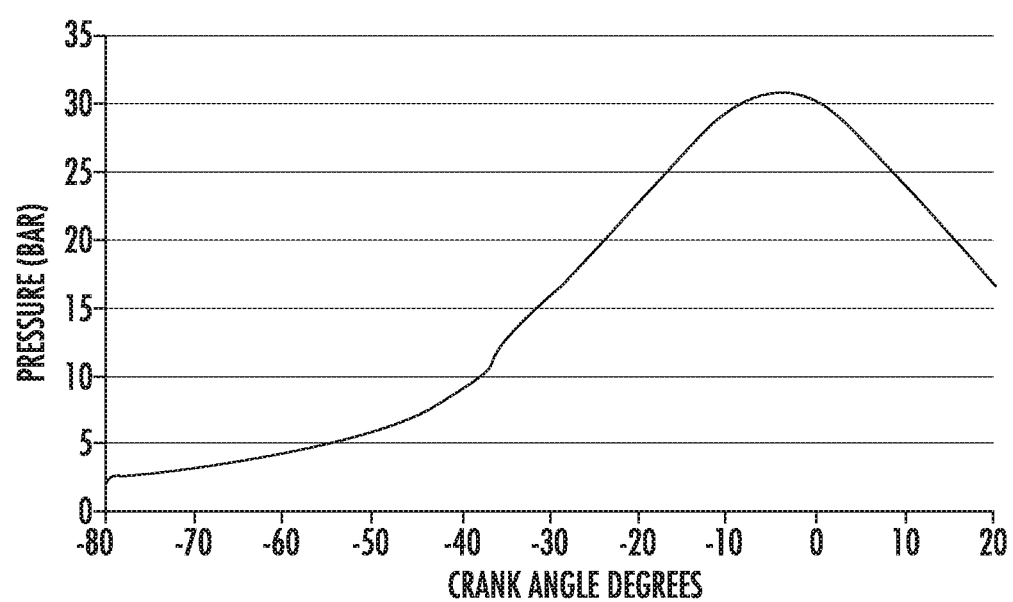
FIG. 9 shows simulation results illustrating the in cylinder pressures for the embodiment of FIG. 3.

Computer simulations were also performed to illustrate this operation of this embodiment. Chemical kinetics autoignition simulation results for operation of the clean-up engine 114 with an equivalence ratio of 10 and 20, starting from 400 C at bottom dead center, can be seen in FIGS. 8 and 9. FIG. 8 shows the in-cylinder temperature as a function of crank angle degrees. FIG. 9 shows the in-cylinder pressure as a function of crank angle degrees. Results were obtained using CHEMKIN software and the GRI 3 mechanism, with the gasifier gas composition with 17% water shown in table 1. For equivalence ratios of 10, even at compression ratio of 8, the fuel/air mixture auto ignites. For equivalence ratio of 20, there is no auto ignition.

It is desirable to have the temperature and the residence time at this temperature high enough in order to destroy the tars (by either decomposition or pyrolysis or other means). With the limited amount of oxygen, it may be possible that the tars are combusted preferentially with the limited air, although the hydrogen may compete with the tars for the oxygen molecules. The residence time is determined mostly by the engine speed. FIG. 8 shows that the temperature is relatively constant over a period of 40 crank angle degrees. For 1200 rpm operation, the residence time is about 5 ms. Lower rpm may be used to increase residence time and improve tar destruction efficiency. However, lower engine speeds results in lower throughput through the engine. It is possible to increase the temperature by increasing the inlet temperature beyond 400 C (the producer gas is actually generated at 700 C), by increasing the compression ratio or by increasing the air/fuel ratio. Auto ignition may be desirable for some applications to decrease the need for the engine control (sparking timing), but sparking could be used for achieving spark-assisted HCCI mode. Some combustion in the cylinder is desirable (with the presence a small amount of air), both to increase the overall temperature and provide some free oxygen for the gas cleanup, but also to decrease the power requirement for the engine. With some combustion in the cylinder, the engine actually generates limited amounts of power. The cleaned producer gas can be used downstream from the engine either to make power, synthesize liquid fuels, or both.

In certain embodiments, the exhaust valve timing of the clean-up engine 114 may be modified. For example, in certain embodiments, it may be advantageous to open the exhaust valve earlier such that the chemical composition in the cylinder is maintained close to peak temperature and pressure. The expansion and cooling in the exhaust serves the function of a rapid quench of the gases. Alternatively, in certain embodiments, water or another liquid may be directly injected into the cylinders of the clean-up engine

114 during the exhaust stroke to maintain the chemical composition in the cylinder close to the composition at peak temperature and pressure.

In certain embodiments, it is possible that the clean-up engine 114 may destroy heavier organic components, but not some of the lighter organic components, such as naphthalene. To reduce the possibility of fouling in the power engine 116, the size of heat exchanger 115 may be selected so that the fuel that is introduced into the power engine 116 is at a higher temperature, such as above the dew point of the lighter organic components.

While air is disclosed as being an input to the clean-up engine 114, any oxygen-containing gas may be used. For example, in certain embodiments, rather than using air from an air filter 103, the clean-up engine 114 may utilize ozone from an ozone generator, pure oxygen, or oxygen-enriched air. The advantage of using oxygen enriched air or oxygen is that the heating value of the treated exhaust is higher than when air is used, because of the dilution with nitrogen. The high concentration oxygen may be obtained by enriching air by the use of membranes, or by the use of water electrolysis, or other means.

In certain embodiments, the power engine 116 may be a dual fuel engine. For example, the power engine 116 may have a diesel pilot but mostly burns the fuel from the clean-up engine 114. The use of diesel may improve the ignition of the power engine 116 as compared to a spark ignited engine. In certain embodiments, the diesel fuel is introduced into a prechamber in the power engine 116.

It is noted that the variations described above can be used alone or in combination with other variations.

Engine Modifications to Use Hot Producer Gas—Operation

To allow the internal combustion engine to burn producer gas at temperatures higher than 400 C, certain modifications are required on standard engine design and operation. Engine operation needs to be significantly modified to accommodate the combustion characteristics of hot producer gas.

Engine Modifications to Use Hot Producer Gas—Design

The engine needs to be modified in order to allow for the high temperature in the inlet. The inlet valves may have to be changed, but the inlet gas temperatures are not substantially different that the exhaust temperature, and the exhaust valves are able to survive the high temperature. The manifold needs to withstand the high temperatures. It is likely that for an inexpensive system, the input would be at about atmospheric pressure, in order to eliminate the need for blowers/compressors. However, for some applications it may be desirable to have the producer gas be at higher pressures, most likely by pressurizing the air and/or steam that is introduced into the gasifier, and operating the gasifier at higher pressures, with higher pressure in the inlet manifold. In this case, the manifold has to be able to withstand the high temperature and elevated pressure. At the higher inlet pressures the gas throughput of the engine increases, resulting in more compact systems for a given throughput.

In some embodiments, it would be advantageous to modify the valve timing. For example, in the case when the engine is used for pressurizing the producer gas, it would be best to avoid valve overlap. Additionally, the exhaust valve may be opened earlier than would occur in conventional engines. It is not necessary to have variable valve timing, as the engine operates mostly in steady state with limited rate of variation, and likely at constant speed (for driving the generator). Thus, the engine cam is modified in order to operate the valves with unconventional timing.

Some cases where unconventional timing is useful would be when it is desirable to change the compression ratio by adjusting the inlet valve closing (during the compression stroke). The unconventional timing can be used to vary the compression ratio, as well as to vary the rate of use of the producer gas (changing both the throughput and/or the power generated. 5 to 10 degrees of adjustment in the closing of the inlet valve should result in a small adjustment of the compression ratio.

It may be also desirable to use the engine so that the expansion ratio is higher than the compression ratio, by proper selection of the valve timing or by the use of Aktinson cycle. Thus, it is possible to extract more power from the engine (increasing the efficiency) while at the same time reducing the exhaust gas temperature. Reduction of the gas temperature is useful for several applications. In the case that an engine is used to combust the tar-loaded producer gas (the first embodiment, shown in FIG. 2), lower temperature is desirable. In the case of the engine being used for cleaning up the producer gas, the cleaned producer gas needs to be burnt in an engine, and lowering the temperature of the cleaned producer gas is one of the methods for avoiding knock in the second power engine and minimizes the heat exchanger requirements between the clean-up engine 114 and the power engine 116. The temperature of exhaust would decrease, and maybe eliminate, the need for a producer gas heat exchanger between the clean-up engine 114 and the power engine 116. Also, it may be possible to cool the cleaned producer gas by the introduction of water in the clean-up engine during the expansion phase (after top dead center but before bottom dead center). The earlier the water injection, the more pronounced effect it has on the temperature at the exhaust, decreasing the amount of water that is required to obtain a given temperature of the exhaust.

Variable engine speed in the power engine can be used, coupled with a gear box that would run the generator at approximately constant speed, even though the engine is operating at varying speeds. The use of an automotive engine coupled to a conventional or near conventional automotive transmission would substantially decrease the cost of the unit, as both of these units are inexpensive due to mass production. In particular, a continuous variable transmission (CVT) would be ideal for controlling the speed of the generator when the engine speed is varying.

One potential use of the producer gas cleanup is for the flexible production of fuels or electricity. The engine cleanup can be part of a polygeneration system, which can produce fuels, electricity or both at different times. The fuel that is produced serves as an energy storage media, which can be burned in a stationary engine or could be used as a transportation fuel. In polygeneration, the cleaned producer gas can be used to make methanol, ethanol FT, or other chemicals when the electrical power is not needed.

One advantage of the proposed approach is that the engines for handling the tar-loaded producer gas can be fit in a skid, assembled at a remote manufacturing plant, and transported to the site.

Although specific types of gasifiers have been disclosed, any gasifiers can be used in this process, which is useful when the producer gas is tar-loaded. Some of the gasifiers where the engine concept is useful include toplit updraft (TLUD), downdraft, bottom lit updraft, plasma enhanced gasifiers and any other unit that produces tar-loaded gases.

While the above disclosure suggests the use of a 4 stroke combustion engine, it is understood that other engines, such as 2 stroke engines, may also be utilized.

Further, while the figures show the initial fuel as being biomass, other embodiments are also possible. For example, the embodiments of FIGS. 2 and 3 are applicable to all forms of solid organic or partially organic fuel gasification, including:

gasification to manufacture chemicals and fuels;
gasification of waste, such as municipal solid waste;
gasification of plates, tires and other industrial organic waste; and
gasification of coal.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for producing power from a producer gas, wherein the producer gas comprises heavy organic components known as tar, comprising:
   a clean-up engine, comprising one or more cylinders, wherein an input to the one or more cylinders of the clean-up engine comprises a rich mixture of the producer gas and an oxygen-containing gas, wherein the producer gas enters the clean-up engine at a temperature greater than a dew point of the tar, wherein the tar is not removed from the producer gas prior to entering the clean-up engine and wherein the clean-up engine exhausts a cleaned producer gas;
   a power engine, comprising one or more cylinders, where the cleaned producer gas exhausted from the clean-up engine is directed to the one or more cylinders of the power engine; and
   a generator that produces power due to rotation of a driveshaft in the power engine.

2. The system of claim 1, wherein the clean-up engine lacks an ignition source and relies on increased pressure of the rich mixture to cause ignition.

3. The system of claim 1, wherein the rich mixture contains less than 50% of the stoichiometric amount of oxygen-containing gas.

4. The system of claim 1, wherein the oxygen-containing gas comprises air.

5. The system of claim 1, wherein the oxygen-containing gas comprises ozone.

6. The system of claim 1, wherein the oxygen-containing gas is pure oxygen.

7. The system of claim 1, wherein the oxygen-containing gas comprises oxygen-enriched air.

8. The system of claim 1, wherein the cleaned producer gas is exhausted at an elevated pressure.

9. The system of claim 1, wherein water or another liquid is directly injected into the clean-up engine during an exhaust stroke to maintain a chemical composition of the cleaned producer gas close to a chemical composition at peak temperature and pressure.

10. The system of claim 1, wherein an expansion ratio of the clean-up engine is higher than a compression ratio to decrease a temperature of the cleaned producer gas.

11. The system of claim 1, wherein the producer gas is generated by gasification of organic material.

12. The system of claim 11, wherein the organic material comprises biomass.

13. The system of claim 11, wherein the organic material comprises municipal solid waste.

14. The system of claim 11, wherein the organic material comprises industrial organic waste.

15. The system of claim 1, wherein the cleaned producer gas is passed through a heat exchanger prior to entering the power engine.

16. The system of claim 1, wherein the cleaned producer gas comprises lighter organic components, and the cleaned producer gas is maintained at a temperature above a dew point of the lighter organic components prior to entering the power engine.

17. The system of claim 1, wherein the power engine comprises a dual fuel engine, and a second fuel comprises diesel fuel.

18. The system of claim 17, wherein the power engine comprises a prechamber into which the diesel fuel is introduced.

19. The system of claim 1, wherein the one or more cylinders of the clean-up engine and the one or more cylinders of the power engine reside in a single engine.

20. The system of claim 19, wherein an equal number of cylinders are used as part of the clean-up engine and as part of the power engine.

21. The system of claim 1, further comprising a heat exchanger disposed between the clean-up engine and the input to the power engine.

22. The system of claim 1, further comprising a synthesis plant, wherein the cleaned producer gas is used for synthesizing chemicals by the synthesis plant.

23. The system of claim 22, wherein fuel is synthesized when electricity is not needed.

24. A system to produce chemicals from a producer gas, wherein the producer gas comprises heavy organic components known as tar, comprising:
   a clean-up engine, comprising one or more cylinders, wherein an input to the one or more cylinders of the clean-up engine comprises a rich mixture of the producer gas and an oxygen-containing gas, wherein the producer gas enters the clean-up engine at a temperature greater than a dew point of the tar, wherein the tar is not removed from the producer gas prior to entering the clean-up engine and wherein the clean-up engine exhausts a cleaned producer gas; and
   a synthesis plant, wherein the cleaned producer gas is used for synthesizing chemicals by the synthesis plant.

25. The system of claim 24, wherein the cleaned producer gas is passed through a heat exchanger prior to entering the synthesis plant.

26. The system of claim 24, wherein the synthesis plant produces methanol, ethanol, or FT liquids.

27. A method of cleaning producer gas, wherein the producer gas comprises heavy organic components known as tar, comprising:

introducing the producer gas at a temperature greater than a dew point of the tar to a cylinder of an engine, wherein the tar is not removed from the producer gas prior to introduction to the engine;

introducing less than a stoichiometric amount of an oxygen-containing gas into the cylinder to create a rich mixture comprising the producer gas and the oxygen-containing gas;

compressing the rich mixture within the cylinder;

combusting the rich mixture to destroy the tar; and exhausting cleaned producer gas from the cylinder.

28. The method of claim 27, wherein the producer gas and the oxygen-containing gas are mixed prior to introduction to the cylinder.

29. The method of claim 28, wherein the cylinder lacks an ignition source and relies on increased pressure of the rich mixture to cause ignition.

30. The method of claim 28, wherein the rich mixture contains less than 50% of the stoichiometric amount of oxygen-containing gas.

31. The method of claim 27, wherein the oxygen-containing gas comprises air.

32. The method of claim 27, wherein the oxygen-containing gas comprises ozone.

33. The method of claim 27, wherein the oxygen-containing gas is pure oxygen.

34. The method of claim 27, wherein the oxygen-containing gas comprises oxygen-enriched air.

35. The method of claim 27, wherein the cleaned producer gas is exhausted at an elevated pressure.

\* \* \* \* \*